(12) United States Patent
Giancola et al.

(10) Patent No.: US 10,460,462 B2
(45) Date of Patent: Oct. 29, 2019

(54) SYSTEM AND METHOD FOR THREE-DIMENSIONAL IMAGE RECONSTRUCTION USING AN ABSOLUTE ORIENTATION SENSOR

(71) Applicant: King Abdullah University of Science and Technology, Thuwal (SA)

(72) Inventors: Silvio Giancola, Thuwal (SA); Bernard Semaan Ghanem, Thuwal (SA); Jens Schneider, Thuwal (SA); Peter Wonka, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 16/172,067

(22) Filed: Oct. 26, 2018

(65) Prior Publication Data

US 2019/0066318 A1     Feb. 28, 2019

Related U.S. Application Data

(62) Division of application No. 15/653,163, filed on Jul. 18, 2017.

(Continued)

(51) Int. Cl.
*G06T 7/55* (2017.01)
*G06T 19/20* (2011.01)
(Continued)

(52) U.S. Cl.
CPC ............... *G06T 7/55* (2017.01); *G06K 9/00* (2013.01); *G06T 1/0007* (2013.01); *G06T 7/30* (2017.01);
(Continued)

(58) Field of Classification Search
None
See application file for complete search history.

(56) References Cited

U.S. PATENT DOCUMENTS

| 9,251,590 B2 | 2/2016 | Sharp et al. |
| 2013/0004060 A1* | 1/2013 | Bell ................... G01S 17/89 382/154 |

(Continued)

OTHER PUBLICATIONS

Houraud, R., Dornaika, F.: Hand-eye calibration. The International Journal of Robotics Research 14(3) (1995) 195-210.

(Continued)

*Primary Examiner* — Yanna Wu
(74) *Attorney, Agent, or Firm* — Billion & Armitage; Michael A. Collins (57) ABSTRACT

A three-dimensional image reconstruction system includes an image capture device, an inertial measurement unit (IMU), and an image processor. The image capture device captures image data. The inertial measurement unit (IMU) is affixed to the image capture device and records IMU data associated with the image data. The image processor includes one or more processing units and memory for storing instructions that are executed by the one or more processing units, wherein the image processor receives the image data and the IMU data as inputs and utilizes the IMU data to pre-align the first image and the second image, and wherein the image processor utilizes a registration algorithm to register the pre-aligned first and second images.

7 Claims, 5 Drawing Sheets

Related U.S. Application Data (60) Provisional application No. 62/363,639, filed on Jul. 18, 2016.

(51) Int. Cl.
   *G06T 1/00* (2006.01)
   *G06T 17/00* (2006.01)
   *G06T 7/30* (2017.01)
   *G06K 9/00* (2006.01)

(52) U.S. Cl.
   CPC .............. *G06T 17/00* (2013.01); *G06T 19/20* (2013.01); *G06K 2209/40* (2013.01); *G06T 2200/08* (2013.01); *G06T 2207/10028* (2013.01); *G06T 2210/56* (2013.01)

(56) References Cited

U.S. PATENT DOCUMENTS

| | | |
|---|---|---|
| 2014/0098018 A1 | 4/2014 | Kim |
| 2017/0067739 A1* | 3/2017 | Siercks ................ G01C 15/002 |

OTHER PUBLICATIONS

R. Tsai et al, A new technique for fully autonomous and efficient 3d robotics hand/eye calibration. ieee Transactions on Robotics and Automation, vol. 5, No. 3, Jun. 1989.
Alahi, et al., "FREAK: Fast Retina Keypoint", 2012, 1-8.
Axelsson, et al., "Processing of laser scanner data—algorithms and applications", ISPRS Journal of Photogrammetry & Remote Sensing, 1999, 138-147.
Bay, et al., "SURF: Speeded Up Robust Features", 2006, 1-14.
Besl, et al., "A Method for Registration of 3-D Shapes", IEEE Transactions on Pattern Analysis and Machine Intelligence, Feb. 1992, 239-256.
Bleser, et al., "Using Optical Flow as Lightweight SLAM Alternative", Augmented Vision German Research Center for Artificial Intelligence, 2009, 175-176.
Bosch, "Intelligent Absolute Orientation Sensor, 9-Axis Sensor Fusion All-in-One Windows 8.x Compliant Sensor Hub", Bosch Invented for life, Nov. 2014, 1-105.
Calonder, et al., "BRIEF: Binary Robust Independent Elementary Features", 2010, 1-14.
Corti, et al., "A metrological characterization of the Kinect V2 time-of-flight camera", Robotics and Autonomous Systems, 2016, 584-594.
D., et al., "Kinect Fusion Improvement Using Depth Camera Calibration", Jun. 2014, 479-485.
Davison, et al., "MonoSLAM: Real-Time Single Camera SLAM", IEEE Transactions on Pattern Analysis and Machine Intelligence, Jun. 2007.
Dissanayake, et al., "A Solution to the Simultaneous Localization and Map Building (SLAM) Problem", IEEE Transactions on Robotics and Automation, Jun. 2001, 229-241.
Durrant-Whyte, et al., "Simultaneous Localization and Mapping: Part I", Tutorial, Jun. 2006, 1-10.
Endres, et al., "An Evaluation of the RGB-D SLAM System", 2012, 1-6.
Filliat, et al., "A visual bag of words method for interactive qualitative localization and mapping", IEEE International Conference on Robotics and Automation, Apr. 2007, 3921-3926.
Fischler, et al., "Random Sample Consensus: A Paradigm for Model Fitting with Applications to Image Analysis and Automated Cartography", Jun. 1981, 381-395.
Foix, et al., "Lock-in Time-of-Flight (ToF) Cameras: A Survey", Mar. 2011, 1-11.
Gao, et al., "Complete Solution Classification for the Perspective-Three-Point Problem", 2003, 1-33.
Geng, et al., "Structured-light 3D surface imaging: a tutorial", Sep. 22, 2010, 128-160.
Grisetti, et al., "Non-linear Constraint Network Optimization for Efficient Map Learning", 2009, 1-12.
Hesch, et al., "A Direct Least-Squares (DLS) Method for PnP", IEEE International Conference on Computer Vision, 2011, 383-390.
Yost, "Yost Labs 3-Space SensorTM", Product Family, Technical Brief, 2017, 1-2.
Izadi, et al., "KinectFusion: Real-time 3D Reconstruction and Interaction Using a Moving Depth Camera", 2011, 1-10.
Khoshelham, et al., "Accuracy and Resolution of Kinect Depth Data for Indoor Mapping Applications", Sensors, 2012, 1437-1454.
Kummerle, et al., "g2o: A General Framework for Graph Optimization", 2011, 1-7.
Labbe, et al., "Online Global Loop Closure Detection for Large-Scale Multi-Session Graph-Based SLAM", Sep. 2014, 1-7.
Lepetit, et al., "EPnP: An Accurate O(n) Solution to the PnP Problem", Springer, Apr. 15, 2008, 1-12.
Leutenegger, "BRISK: Binary Robust Invariant Scalable Keypoints", 2011, 1-8.
Leutenegger, et al., "Keyframe-Based Visual-Inertial SLAM Using Nonlinear Optimization", Robotics: Science and Systems, Jun. 2013, 1-8.
Lowe, "Object Recognition from Local Scale-Invariant Features", Proc. of the International Conference on Computer Vision, Corfu, Sep. 1999, 1-8.
Lu, et al., "Globally Consistent Range Scan Alignment for Environment Mapping", 1997, 333-349.
Machado, et al., "An Evaluation of 2D SLAM Techniques Available in Robot Operating System", 2013, 1-6.
Marzorati, et al., "Monocular SLAM with Inverse Scaling Parametrization", 2008, 1-10.
Moulon, et al., "Global Fusion of Relative Motions for Robust, Accurate and Scalable Structure from Motion", Oct. 15, 2013, 1-9.
Newcombe, et al., "DynamicFusion: Reconstruction and Tracking of Non-rigid Scenes in Real-Time", 2015, 1-10.
Newcombe, et al., "KinectFusion: Real-Time Dense Surface Mapping and Tracking", 2011, 127-136.
Niessner, et al., "Combining Inertial Navigation and ICP for Real-time 3D Surface Reconstruction", Eurographics, 2014, 1-4.
Nist'er, "Preemptive RANSAC for live structure and motion estimation", Machine Vision and Applications, 2005, 321-329.
Pini'es, et al., "Inertial Aiding of Inverse Depth SLAM using a Monocular Camera", IEEE International Conference on Robotics and Automation, Apr. 2007, 2797-2802.
Smisek, et al., "3D with Kinect", 2011, 1154-1160.
Thrun, "Robotic Mapping: A Survey", Feb. 2002, 1-31.
Wheelan, et al., "ElasticFusion: Dense SLAM Without a Pose Graph", Robotics: Science and Systems, Jul. 2015, 1-9.
Whelan, et al., "Kintinuous: Spatially Extended KinectFusion", Computer Science and Artificial Intelligence Laboratory, Jul. 19, 2012, 1-10.

\* cited by examiner

SYSTEM AND METHOD FOR THREE-DIMENSIONAL IMAGE RECONSTRUCTION USING AN ABSOLUTE ORIENTATION SENSOR

TECHNICAL FIELD

This invention relates generally to image processing, and in particular to systems and methods for three-dimensional image reconstruction.

BACKGROUND

In computer vision and computer graphics, 3D reconstruction is the process of capturing the shape and appearance of real objects based on recorded images. Typically, 3D reconstruction requires a plurality of 2D images in order to extrapolate the 3D appearance of the object, wherein a registration process is utilized to determine how a new image should be aggregated with the 3D reconstruction.

One of the challenges of 3D reconstruction is how to make it computationally practical, while robust enough to accurately represent 3D scenes. Three prominent classes of reconstruction algorithms are most widely utilized today, but each suffers from drawbacks associated either with robustness and/or computational efficiency. For example, the Kinect Fusion algorithm is configured to run on graphics processing units (GPUs) to increase computational efficiency. It utilizes an iterative closed point (ICP) algorithm wherein a structured point cloud is registered with a merged model of all the previous point clouds. The registration process relies on a point-to-plane formulation of the iterative closed point (ICP) algorithm, in which each iteration should provide a better match between the structured point cloud and the merged model of previous point clouds. However, the Kinect Fusion algorithm is more sensitive to outliers in the registration process and reconstruction drift, and therefore suffers from a lack of robustness. Another reconstruction algorithm is the Simultaneous Localization and Mapping (SLAM) algorithm, which estimates the relative motion between two successive camera acquisitions in real-time in order to determine the orientation of the camera. However, a drawback of most SLAM methods (there are several variants) is the accumulation of registration error with time, which leads to drift in the determined orientation.

It would be beneficial to develop a system that could provide robust results, while reducing the computational expense of current reconstruction techniques.

SUMMARY

According to one embodiment, a three-dimensional image reconstruction system includes an image capture device, an inertial measurement unit (IMU), and an image processor. The image capture device captures image data. The inertial measurement unit (IMU) is affixed to the image capture device and records IMU data associated with the image data. The image processor includes one or more processing units and memory for storing instructions that are executed by the one or more processing units, wherein the image processor receives the image data and the IMU data as inputs and utilizes the IMU data to pre-align the first image and the second image, and wherein the image processor utilizes a registration algorithm to register the pre-aligned first and second images.

According to another embodiment, a three-dimensional image reconstruction system includes an image capture device, an inertial measurement unit, and an image processor. The image capture device captures images. The IMU is affixed to the image capture device and records IMU data associated with image data. The image processor includes one or more processing units and memory for storing instructions that are executed by the one or more processing units, wherein the image processor receives the image data and the IMU data as inputs, and calculates rigid body motion that includes a rotational component R and a translational component t between the image data and the current reconstructed point cloud. The rotational component R of the calculated rigid body motion, but not the translational component t, is constrained by the IMU data. The image processor utilizes a registration algorithm to register the image data with the current reconstructed point cloud.

According to another embodiment, a method of reconstructing a three-dimensional image from a plurality of received images includes generating a partial point cloud from a received image. The partial point cloud is then pre-aligned with a current reconstructed point cloud based on orientation data provided by an inertial measurement unit (IMU). Rigid body motion is calculated between the partial point cloud and the current reconstructed point cloud until a distance between points in the partial point cloud and the current reconstructed point cloud is minimized. Based on the minimized rigid body motion calculated, the partial point cloud is registered with the current reconstructed point cloud to update the current reconstructed point cloud.

According to another embodiment, a method of reconstructing a three-dimensional image from a plurality of received images includes generating a partial point cloud from a received image. A rigid body motion (R, t) is calculated that includes a rotational component R and a translational component t between the partial point cloud and the current reconstructed point cloud, wherein the rotational component R, but not the translational component t, is constrained by orientation data provided by an inertial measurement unit (IMU). The partial point cloud is registered with the current reconstructed point cloud to update the current reconstructed point cloud based on the calculated rigid body motion.

DETAILED DESCRIPTION

The present invention provides a system and method of processing images to generate 3D reconstructions. In particular, the present invention utilizes absolute orientation measurements derived from an inertial measurement unit (IMU) at various stages of the reconstruction process. Although a variety of different types of reconstruction algorithms are known—such as the Kinect Fusion and SLAM—they each rely on the registration of images/point clouds with previous captured point clouds/models. In one embodiment, the orientation data is utilized to pre-align two or more images/point clouds prior to registration. The pre-alignment minimizes the error between the images and due to the improved alignment reduces the number of iterations required to register the images, thereby reducing the computational complexity of the operation and improving robustness. In other embodiments, the orientation data is utilized as a hard constraint in the rigid body motion computations to determine orientation, thereby reducing the rigid body motion problem from one involving six degrees of freedom (DoF) to one involving three DoFs. Once again, this simplification reduces the computational complexity of the reconstruction process.

Figure 1:
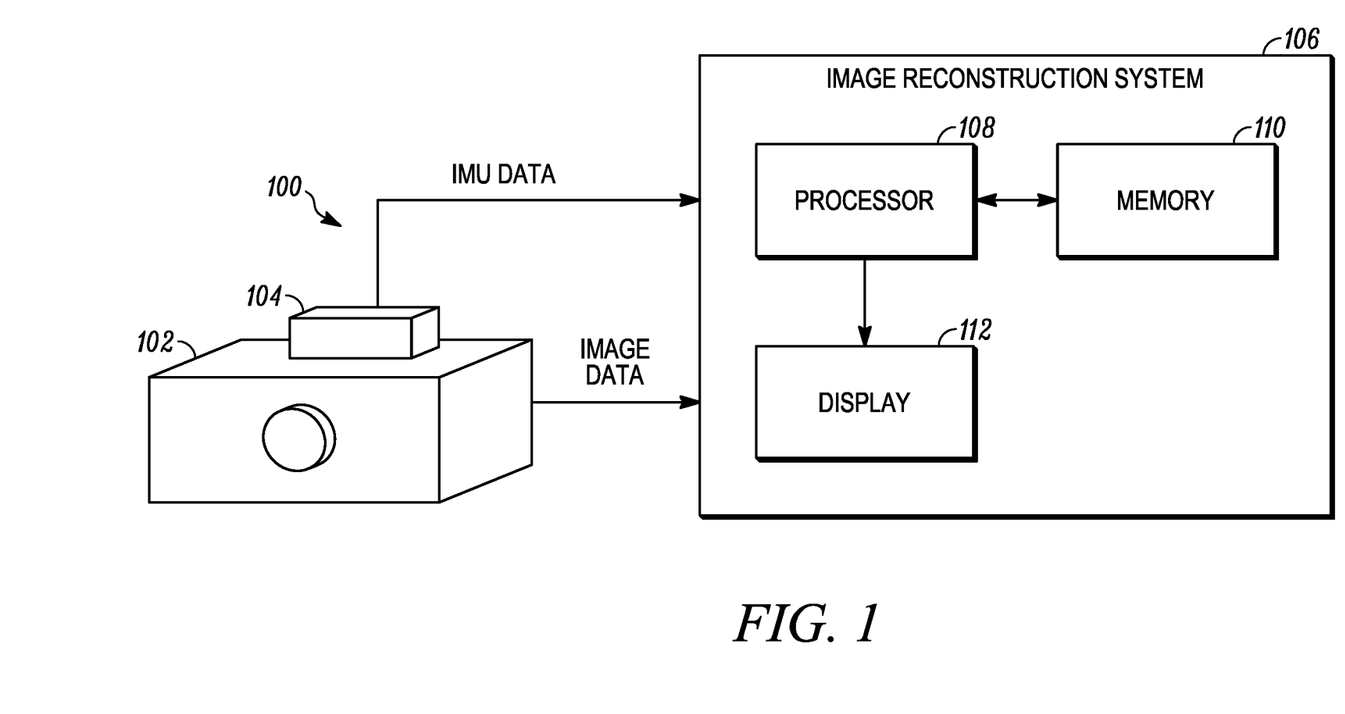
FIG. 1 is a schematic diagram of a three-dimensional image reconstruction system 100 according to an embodiment of the present invention.

FIG. 1 is a schematic diagram of a three-dimensional image reconstruction system according to an embodiment of the present invention. System 100 includes an camera 102, inertial measurement unit (IMU) 104, and three-dimensional image reconstruction system 106. Camera 102 may include various types of image capture devices capable of converting an optical image into an digital image for subsequent processing. Examples of acceptable cameras include CCD or CMOS-based camera sensors, and while typically capturing images within the visible spectrum of light, may operate outside of the range of visible light (e.g., infrared cameras operating in wavelengths greater than the 400-700 nanometer range associated with visible light). In addition, in one embodiment camera 102 additionally captures depth data, wherein each pixel captured additionally includes information identifying the distance of the pixel from the camera. For example an RGB-D image sensor senses visible light (red, green, and blue or RGB) as well as depth data d. That is, each pixel is represented as a combination of red, blue and green color information, as well as information regarding the depth or distance of the pixel from the camera. Commercially available RGB-D cameras include the Microsoft Kinect camera.

IMU 104 is affixed or otherwise attached to image capture device 102 such that the orientation of IMU 104 relative to image capture device 102 remains fixed. IMU 104 may be comprised of a plurality of sensors utilized in combination to detect absolute orientation. For example, in one embodiment IMU 104 includes a three degree of freedom (DoF) accelerometer, a three DoF magnetometer, and a three DoF gyrometer. Based on these measurements, absolute orientation of IMU 104 can be determined, which because IMU 104 is affixed to image capture device 102 allows for absolute orientation of image capture device 102 to be determined (i.e., camera pose). In one embodiment, the orientation of the image capture device 102 is determined for 6-degrees of freedom, which includes three translational components (x, y, and z components) as well three angular components (e.g., roll, pitch and yaw). Orientation data may be associated with captured images and communicated as a data pair to 3D image reconstruction system 106. In other embodiments, orientation data and image data is communicated separately to 3D image reconstruction system 106, which is responsible for pairing the orientation data with the image data captured at that orientation.

Image data captured by image device 102 and IMU data captured by IMU 104 are provided to 3D image reconstruction system 106 for processing to generate a 3D reconstruction of the imaged objects. In the embodiment shown in FIG. 1, 3D image reconstruction system 106 includes one or more processor units 18, which may include one or more graphical processing units (GPUs), and memory unit 20. Instructions stored by memory unit 20 are executed by the one or more processor units 20 to implement functions for processing the image data and IMU data received by 3D image reconstruction system 106. In one embodiment, 3D reconstruction system 106, including the one or more processor units 18 and memory unit 20 are located locally as part of image device 102 and IMU 104. In other embodiments, 3D image reconstruction system 106 is located remotely from image device 102 and IMU 104, wherein image data and IMU data is communicated from image device 102 and IMU 104 to the 3D image reconstruction system 106.

Image reconstruction system 106 utilizes one of a plurality of modified 3D reconstruction techniques according to embodiments of the present invention. For example, 3D image reconstruction system 106 may utilize an IMU-modified version of the Kinect Fusion reconstruction method, or an IMU-modified version of the Simultaneous Localization and Mapping (SLAM) reconstruction method. In general, these techniques rely on rigid body motion calculations, wherein a 3D rotation and translation between images/point clouds are computed to determine orientation of the image prior to registration. The present invention modifies these 3D construction techniques to incorporate IMU data, which simplifies/reduces the number of calculations required while making the algorithm more robust to errors.

For example, in one embodiment the image reconstruction system 106 generates a partial point cloud based on received image data from camera 102. An IMU measurement from IMU 10 is utilized to pre-align the partial point cloud with the current reconstructed point cloud. A benefit of this arrangement is that by pre-aligning the partial point cloud associated with the current received image based on the IMU data, the registration process begins at a more reasonable estimate of orientation relative to the previously constructed point clouds, and therefore will require fewer iterations to arrive at a final solution more quickly. This method is referred to herein as the "IMU-initialized" method of registration, and may be utilized in conjunction with typical registration algorithms such as the Kinect Fusion reconstruction method and/or the SLAM reconstruction method.

In another embodiment, rather than use the IMU data to pre-align a received image, the IMU orientation data is treated as a hard constraint in the rigid body motion calculation, which reduces the calculation from a problem existing in six degrees of freedom (DoF) to a problem existing in only three DoF. In particular, this reduction in the complexity of the problem to be solved removes uncertainty regarding the effect of rotation in the iterative closest point (ICP) registration process. This method is referred to herein as the "IMU-based" method. Both of these methods are discussed in more detail below, with respect to FIGS. 4a and 4b, respectively. Once again, the IMU-based method may be utilized in conjunction with typical registration algorithms such as the Kinect Fusion reconstruction method and/or the SLAM technique.

In another embodiment utilized either alone or in conjunction with those embodiments described above, IMU information is utilized to filter or remove inconsistent matches between point clouds based on their 3D distance distribution (i.e., IMU-based correspondence filtering approach, discussed with respect to FIG. 4c below). In general, the IMU-based correspondence filtering technique assumes that pre-oriented, successive point clouds will have an approximately constant distance between corresponding points. Distances between points that deviate significantly from an average or mean distance between points are filtered to reduce unreliable keypoints subsequently utilized by the random sample consensus (RANSAC) algorithm or equivalent registration algorithm. In this way, the filter significantly improves stability and robustness of the algorithm.

Figure 2:
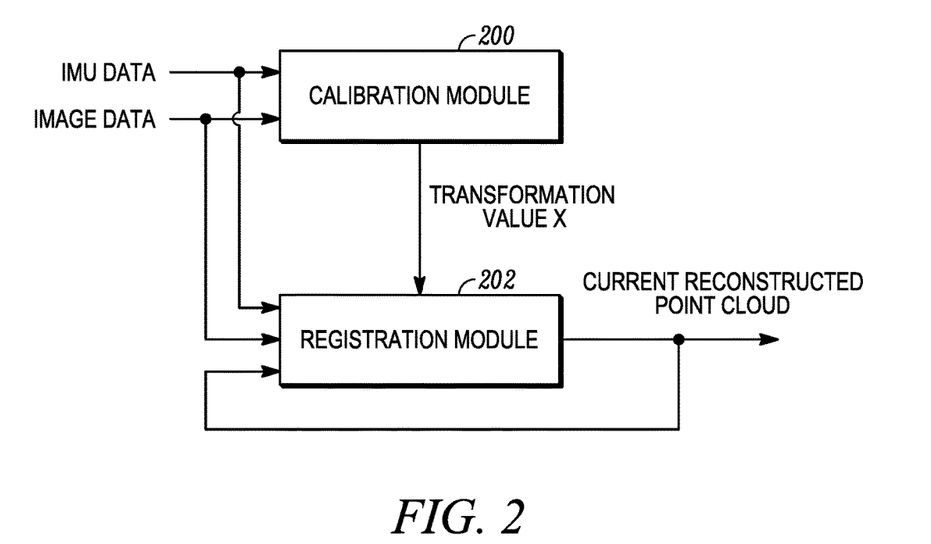
FIG. 2 is a block diagram that illustrates implementation of a calibration module and registration module by the image reconstruction system according to an embodiment of the present invention.

FIG. 2 is a block diagram that illustrates implementation of calibration module 200 and registration module 202 by the image reconstruction system 106 according to an embodiment of the present invention. Calibration module 200 is connected to receive IMU data provided by IMU 104 (shown in FIG. 1) and image data provided by image device 102 (also shown in FIG. 1). In response to the received IMU data and image data, calibration module generates a transformation value X, which represents the mathematical operation required to align the pose measurements in the IMU reference frame with captured images from the camera. Registration module 202 is connected to receive IMU data, image data, and transformation value X. In response to the received inputs, registration module 20 generates a current reconstructed point cloud. In the embodiment shown in FIG. 2, the current reconstructed point cloud is provided as feedback to registration module 202, to be updated with new image data.

As described with respect to FIG. 1, IMU 104 is affixed to the body of camera 102 such that the relative pose or orientation between IMU 104 and camera 102 does not change during acquisition images. However, IMU data (i.e., orientation data) is computed relative to the reference system of IMU 104, such that the measurements must be transformed or calibrated to the camera reference system. This calibration is performed by calibration module 200, and is often-tunes referred to as hand-eye calibration, in which two or more pairs of relative measurements $\{M_i^{cam}, M_i^{IMU} \in SE(3)\}_{i=1}^{N}$ received from the camera and IMU measurements are utilized to compute a transformation variable X that describes the relationship between the camera reference frame and the IMU reference frame. Relative measurements $M_i^{cam}$ and $M_i^{IMU}$ are represented here as included in the set SE(3), which refers to the special Euclidean group that includes translations and rotations in n-dimensional space (here, three-dimensional space), which is utilized in defining the moves of a rigid body in n-dimensional space.

Computation of the transformation variable X requires solving the following equation for the unknown transformation variable $X \in SE(3)$ between the IMU and the camera reference system:

$$M_i^{cam} X = X M_i^{IMU} \; \forall i = 1, \ldots, N \qquad \text{Equation 1}$$

wherein N represents the number of poses utilized in conjunction with solving Equation 1. While only two poses $(M_1^{cam}, M_1^{IMU})$ and $(M_2^{cam}, M_2^{IMU})$ are technically required, additional pose measurements will improve (i.e., decrease) the uncertainty of the computed transformation variable.

A number of calibration methods have been proposed for solving hand-eye problems and may be utilized. For example, in one embodiment the relative transformation X is calculated using the standard global approach described by Houraud, R., Dornaika, F.: Hand-eye calibration. *The International Journal of Robotics Research* 14(3) (1995) 195-210. In another embodiment, an algorithm provided by Tsai and Lenz (citation needed) utilizes a least-square solution that suppresses measurement noise.

Having computed the calibration transformation X, registration module 202 uses received IMU data, image data, and the calibration transformation X to calculate a current reconstructed point cloud, which represents the global or cumulative 3D reconstruction of a scene based on previously received and processed image data and IMU data. In the embodiment shown in FIG. 2, the current reconstructed point cloud is provided as feedback to registration module 202, wherein a subsequent partial point cloud computed from new image data and IMU data is registered (added) to the current reconstructed point cloud. In this way, the output of registration module 202 is a reconstructed point cloud that represents an aggregation of partial point clouds. In general, registration module 202 relies on one of a plurality of 3D reconstruction techniques such as Kinect Fusion, RDB-D SLAM, among others. Incorporating IMU data into these 3D reconstruction techniques is described in more detail with respect to FIGS. 4a-4c, below.

Figure 3:
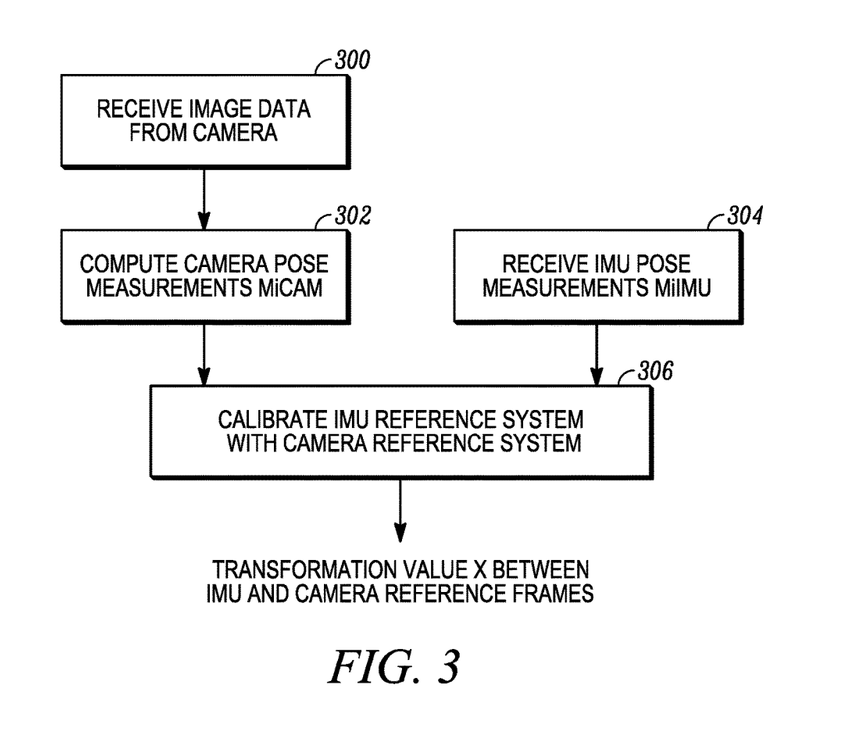
FIG. 3 is a flowchart that illustrates steps performed by the calibration module according to an embodiment of the present invention.

FIG. 3 is a flowchart that illustrates steps performed by the calibration module according to one embodiment of the present invention. In the embodiment shown in FIG. 3, at step 300 image data is received from image device or camera 102 (as shown ire FIG. 1). The image data does not directly carry orientation data, and therefore must be calculated based on comparisons between an initial pose and subsequent poses. In the embodiment shown in FIG. 3, at step 302 camera pose measurements $M_i^{cam}$ are computed by calculating relative transformations between an initial pose and subsequent poses (i.e., orientations). In one embodiment, this includes computing point clouds for each image (i.e., initial pose image and subsequent pose image), and aligning the point clouds. Alignment of point clouds may rely on a manually pre-alignment of the point clouds, followed by application of an iterative closest point algorithm to align the point clouds with one another. Once aligned, camera pose measurements $M_i^{cam}$ can be determined by calculating a transformation between the two point clouds.

At step 304, IMU pose measurements $M_i^{IMU}$ are received. In contrast with calculation of camera pose measurements, IMU pose measurements $M_i^{IMU}$ rely on the orientation measurement provided by the sensor itself, and therefore no additional computation is required.

At step 306, calibration between the IMU reference system and the camera reference system is computed by solving Equation 1, as provided above. As discussed above, a variety of methods may be utilized to solve Equation 1, including utilization of quaternions and dual quaternions, respectively, as described by Horaud, R., Dornika, F.: Hand-eye calibration. The international journal of robotics research 14(3) (1995) 195-210. In one embodiment, while the IMU provides orientation and position (translational) information, only the orientation information provided by the IMU is relevant. As a result, the position or translational component of the IMU data may be omitted by setting it equal to the translational part of the associated camera pose. One benefit of this approach is that it simplifies the computations required to solve Equation 1, because only the rotational portion $R \in SO(3)$ of X is required to be solved. In this way, calibration module 200 provides the calibration transformation X that allows orientation information provided by the IMU device to be transformed via X to the reference frame of the camera.

Figure 4A:
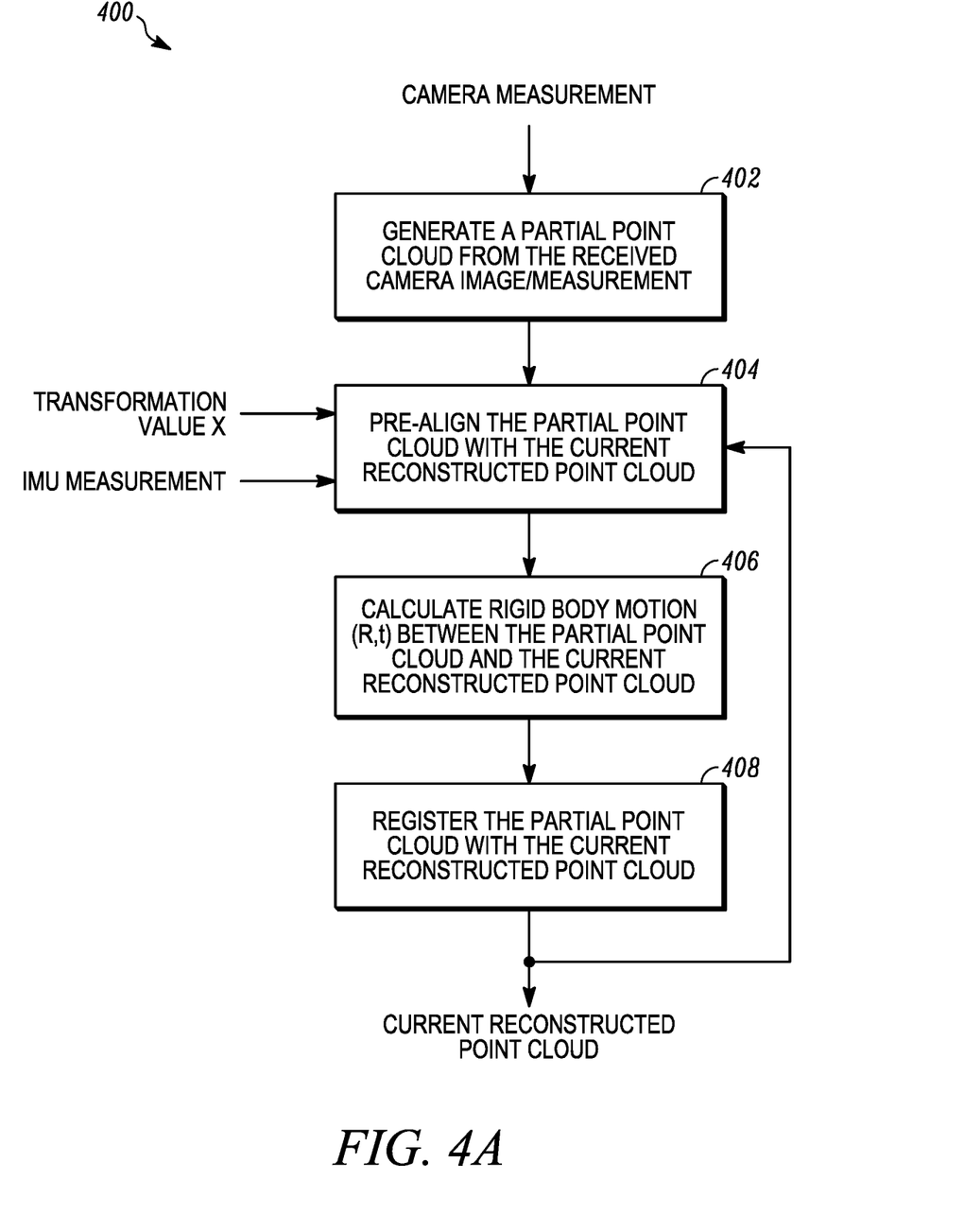
FIGS. 4a-4c are flowcharts that illustrate steps performed by the registration module according to various embodiments of the present invention.
Figure 4B:
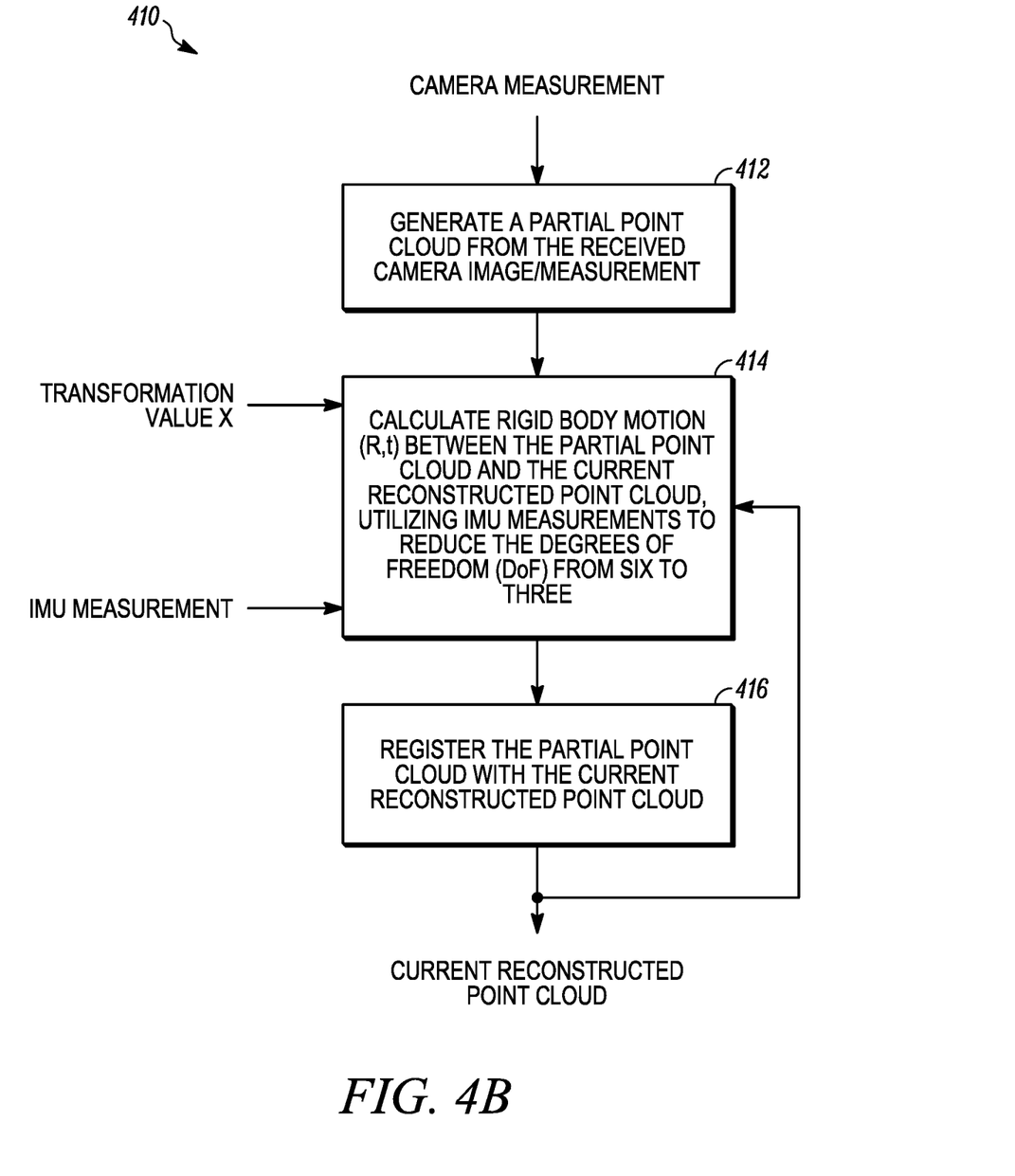
Figure 4C:
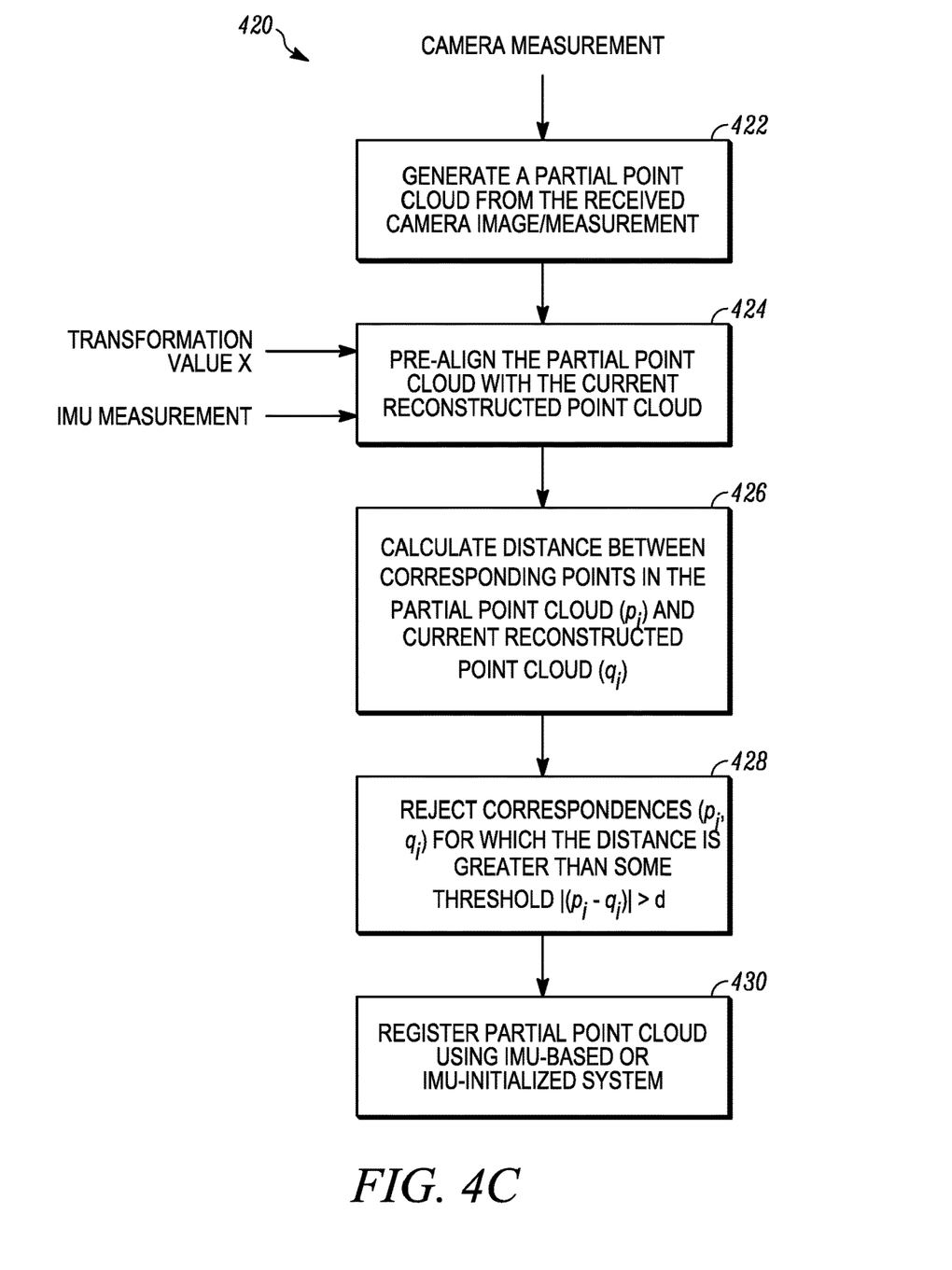

FIGS. 4a-4c are flowcharts that illustrate steps performed by the registration module 202 according to various embodiments of the present invention. In particular, FIG. 4a describes steps utilized by the IMU-initialized method of 3D reconstruction, in which IMU measurements are utilized to pre-align point clouds and wherein the pre-alignment improves the original estimate of relative orientation between the point clouds.

At step 402, camera measurements are received and utilized to generate a partial point cloud. At this point, no orientation information associated with the partial point cloud is available. At step 404, orientation information is received from IMU 104, along with transformation value X calculated by calibration module 200 (shown in FIG. 2). The orientation information and transformation value X is utilized at step 404 to pre-align the partial point cloud with the current reconstructed point cloud. A benefit of pre-aligning the partial point cloud with the current reconstructed point cloud based on the orientation information provided by the IMU is that is produces a more reasonable starting point for the subsequent registration step, and therefore improves the quality of the initial correspondences found between the partial point cloud and the reconstructed point cloud during the registration process.

At step 406 the rigid body motion (R, t) between the partial point cloud and the reconstructed/global point cloud is computed. In this embodiment, the rigid body motion computation requires solving a 3D rotation and translation prior to registration of the partial point cloud with the current reconstructed point cloud. Various methods are available for registering the partial point cloud with the reconstructed point cloud. In one embodiment, an iterative closed point (ICP) algorithm is utilized, in which the partial point cloud (generated from the received image) is registered with a merged model of all the previous point clouds (i.e., the reconstructed/global point cloud). In one embodiment, reconstructed/global point cloud is stored in a graphics processing unit (GPU) as a limited-size Truncated Signed Distance Function (TSDF) cube, which is incrementally updated whenever new images are received. Registration of partial point clouds (corresponding with a newly received image) with the reconstructed/global point cloud relies on a point-to-plane formulation of ICP algorithm. This registration technique iteratively transforms the partial point cloud to best match (i.e., align with) the reconstructed/global point cloud. In each ICP iteration, the points within the partial point cloud, represented by $\{p_i\}_{i=1}^N$, and their closest points within the reconstructed/global point cloud $\{q_i\}_{i=1}^N$, and lines extending in a normal direction from each of the points (i.e., surface normal) $\{n_i\}_{i=1}^N$. The following rigid body motion equation is solved in iterative fashion until the distance between the points is minimized, indicating that the partial point cloud is well-aligned with the reconstructed/global point cloud:

$$(R^*, t^*) = \frac{\arg \min}{R \in SO(3); t \in \mathbb{R}^3} \Sigma_{i=1}^N ((Rp_i + t - q_i)^T n_i)^2 \quad \text{Equation 2}$$

wherein the object of the minimization is the sum of the squared distance between each source point $p_i$ in the partial point cloud and the tangent plane $n_i$ at its corresponding destination point $q_i$, (i.e., closest point) in the partial point cloud. The process continues until the error becomes smaller than a threshold or stops getting smaller. R* represents the rotational component of the rigid body motion located within the set 3D rotation group SO(3) (denoted in matrix operations as the "special orthogonal matrix"), t* represents the translational component of rigid body motion located within 3D Euclidean space $\mathbb{R}^3$.

In another embodiment, rather than utilize the iterative closed point (ICP) approach, images may be registered with the reconstructed/global point cloud using the Simultaneous Localization and Mapping (SLAM) method. For example, SLAM techniques may utilize a 2D-to-3D registration that fits newly acquired 2D keypoints with corresponding 3D matching points within the reconstructed/global point cloud. In this embodiment, rigid body motion components (R, t) are computed to minimize the 3D distances between points within a subset of inlier 3D correspondences, per that shown in Equation 3, below:

$$(R^*, t^*) = \frac{\arg \min}{R \in SO(3); t \in \mathbb{R}^3} \Sigma_{i=1}^N \| Rp_i + t - q_i \|_2^2 \quad \text{Equation 3}$$

At step 408, the partial point cloud is registered with the reconstructed/global point cloud based on the minimization of the rigid body motion (R*, t*) calculated with respect to one of the above methods (e.g., those described with respect to Equations 2 or 3, for example). Registration of the partial point cloud with the reconstructed point cloud results in an updated/aggregated reconstructed/global point cloud, wherein the reconstructed/global point cloud is also provided in feedback to step 404 for comparison with subsequently captured images and corresponding new partial point clouds.

A benefit of the approach described with respect to FIG. 4a, is that the IMU information allows the partial point cloud associated with each new image to be pre-aligned with the reconstructed/global point cloud. As a result, the quality of the initial correspondences found between the partial point cloud and the reconstructed/global point cloud is improved in quality, which minimizes the number of iterations required in the registration process to register the partial point cloud with the reconstructed/global point cloud.

FIGS. 4b is a flowchart that illustrate steps performed by the registration module 202 according to another embodiment of the present invention, either alone or in conjunction with the embodiment shown in FIG. 4a. The embodiment shown in FIG. 4b describes steps employed in an IMU-based algorithm, in which orientation measurements are used as a hard constraint, thereby reducing the six DoF problem into a three DoF problem.

At step 412, camera measurements are received and utilized to generate a partial point cloud. At step 414, rigid body motion (R, t) between the partial point cloud generated at step 412 and a reconstructed/global point cloud is calculated. In the embodiment shown in FIG. 4b, the IMU data received from IMU 104 is utilized to determine the rotational component R of the rigid body motion (i.e., used as a hard constraint). As a result, only the translational component t remains unknown, converting the rigid body motion problem from a six DoF problem into a three DoF problem. This reduction disambiguates the effect of rotation in the registration step. The unknown translation component t is updated as the average difference between the pre-rotated points of the partial point cloud, $P=\{p_i\}_{i=1}^N$, and the corresponding points in the reconstructed/global point cloud, $Q=\{q_i\}_{i=1}^N$, as shown in Equation 4, below:

$$R = R_{IMU} \Rightarrow t = \frac{1}{N}\Sigma_{i=1}^N (Rp_i - q_i), t \in \mathbb{R}^3 \quad \text{Equation 4}$$

In this way, the rotational component R of the rigid body motion problem is determined based entirely on the IMU measurements received from IMU 104 (i.e., $R=R_{IMU}$). The rigid body motion problem is therefore reduced from a six DoF problem to a three DoF problem, which significantly simplifies the registration process.

FIG. 4c is a flowchart that illustrates steps performed by the registration module 202 according to another embodiment of the present invention. The embodiment shown in FIG. 4c operates in conjunction with the IMU-initialized and/or IMU-based methods described with respect to FIGS. 4a and 4b, respectively.

At step 422, camera measurements (i.e., image) s received an utilized to generate a partial point cloud. At step 424, orientation information is received from IMU 104, along with transformation value X calculated by calibration module 200 (shown in FIG. 2). The orientation information and transformation value X is utilized at step 424 to pre-align the partial point cloud with the current reconstructed point cloud. At this point, this method is similar to the MU-initialized method described with respect to FIG. 4a, in which the IMU orientation data is utilized to pre-align point clouds prior to registration of the partial point cloud with the current reconstructed point cloud. However, rather than simply begin the registration process, in this embodiment the pre-aligned point clouds are analyzed, and in particular the distance between corresponding points in the pre-aligned point clouds are reviewed for outliers that are filtered out.

At step 426, distances are calculated between corresponding points in the partial point cloud ($p_i$) and the current reconstructed point cloud ($q_i$) (i.e., $\|p_i-q_i\|$). At step 428, the calculated distances between corresponding points ($p_i$, $q_i$) are compared to a threshold value, and those values exceeding the threshold value are discarded as erroneous or outliers. Removing these outliers prevents them from adversely affecting the registration process in subsequent steps. For example, in one embodiment pre-alignment of the partial point cloud with the current reconstructed point cloud results in a roughly constant distance between corresponding points $p_i$-$q_1$. An average or mean value is calculated for the plurality of corresponding points, and because the partial point cloud and current reconstructed point cloud are aligned the distance between most corresponding points should be approximately equal to the calculated average. Those corresponding points that deviate significantly from the calculated average are discarded. For example, in one embodiment the average or median distance between corresponding points is designated as d. In addition, a positional uncertainty is calculated to generate a tolerance t around the calculated average. Having calculated the average/mean distance d and tolerance t, a filter is designed to remove all correspondence points falling outside of the expected range. For example, this can be expressed as rejecting correspondences ($p_i$, $q_i$) for which $|d-\|p_i-q_i\|_2|>t$ is true (i.e., absolute distance between correspondence points $p_i$-$q_i$ is greater/less than a distance d by at least the threshold value t). By removing these outlier correspondences, the stability and robustness of either the IMU-initialized or IMU-based methods of registration (shown in FIGS. 4a and 4b) are improved.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A three-dimensional image reconstruction system comprising:
    an image capture device that captures image;
    an inertial measurement unit (IMU) affixed to the image capture device that records IMU data associated with image data of the captured image; and
    an image processor that includes one or more processing units and memory for storing instructions that are executed by the one or more processing units, wherein the image processor receives the image data and the IMU data as inputs, and calculates rigid body motion (R,t) that includes a rotational component R and a translational component t between the image data and a current reconstructed point cloud, wherein the image processor constrains the rotational component R of the rigid body motion (R,t) between the image data and the current reconstructed point cloud based on the IMU data and a transformation value X, wherein the image processor calculates only the translational component t of the rigid body motion (R,t) between the image data and the current reconstructed point cloud, and wherein the image processor utilizes a registration algorithm to register the image data with the current reconstructed point cloud based on the calculated rigid body motion (R, t) between the image data and the current reconstructed point cloud to generate a three-dimensional image.

2. The three-dimensional image reconstruction system of claim 1, wherein the transformation value X is generated by a calibration module based on two or more pairs of image data and the IMU data.

3. The three-dimensional image reconstruction system of claim 1, wherein the image processor generates a partial point cloud based on the image data.

4. The three-dimensional image reconstruction system of claim 3, wherein the IMU data and the transformation value X is utilized by the image processor to pre-align the partial point cloud with the current reconstructed point cloud.

5. The three-dimensional image reconstruction system of claim 4, wherein the image processor calculates distances between corresponding points in the partial point cloud and the reconstructed point cloud and compares the calculated distances to a threshold.

6. The three-dimensional image reconstruction system of claim 5, wherein the image processor discards those points in which the calculated distance exceeds the threshold.

7. The three-dimensional image reconstruction system of claim 6, wherein the threshold is calculated based on an average distance d between the corresponding points and a tolerance t.

\* \* \* \* \*